United States Patent
Schermuly et al.

(10) Patent No.: US 6,666,182 B2
(45) Date of Patent: Dec. 23, 2003

(54) INTAKE DEVICE FOR AN INTERNAL COMBUSTION ENGINE

(75) Inventors: Thomas Schermuly, Rosengarten (DE); Juergen Lang, Kornwestheim (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 10/098,632

(22) Filed: Mar. 18, 2002

(65) Prior Publication Data

US 2002/0144668 A1 Oct. 10, 2002

Related U.S. Application Data

(63) Continuation of application No. PCT/EP00/07735, filed on Aug. 9, 2000.

(30) Foreign Application Priority Data

Sep. 18, 1999 (DE) ........................................ 199 44 855

(51) Int. Cl.$^7$ ............................................. F02M 35/104
(52) U.S. Cl. ............................. 123/184.55; 123/184.56
(58) Field of Search ........................ 123/184.21–184.61

(56) References Cited

U.S. PATENT DOCUMENTS 4,932,369 A * 6/1990 Parr ....................... 123/184.56
5,357,931 A * 10/1994 Semence ................. 123/184.61
5,575,249 A    11/1996 Mielke et al.
5,642,697 A     7/1997 Jahrens et al.
5,813,380 A *  9/1998 Takahashi et al. ...... 123/184.55
6,073,601 A *  6/2000 Guichard et al. ....... 123/184.55

FOREIGN PATENT DOCUMENTS

| DE | 19728600 | 1/1991 |
| EP | 0355960 | 2/1990 |
| GB | 2279035 | 12/1994 |
| GB | 2295215 | 5/1996 |

* cited by examiner

Primary Examiner—Marguerite McMahon
(74) Attorney, Agent, or Firm—Crowell & Moring LLP

(57) ABSTRACT

An intake device for an internal combustion engine including a mounting flange (10) for mounting to a cylinder head of an internal combustion engine and a plurality of intake manifolds (11–14) which open into a common collecting chamber. The mounting flange (10) and upper shells (23, 24, 25, 26) form a first component; lower shells (27, 28, 29, 30) form a third component, and a central, second component (31) is provided between the first and third components. The respective components are assembled to each other in such a way that the second component is fixed to the first component by a positive fit, and the third component is fixed to the second component in the same way. The components are preferably secured together by friction welding.

6 Claims, 4 Drawing Sheets

INTAKE DEVICE FOR AN INTERNAL COMBUSTION ENGINE

CROSS REFERENCE TO RELATED APPLICATIONS

This application is a continuation of international patent application no. PCT/EP00/07735, filed Aug. 9, 2000, designating the United States of America, the entire disclosure of which in incorporated herein by reference. Priority is claimed based on Federal Republic of Germany patent application no. DE 199 44 855.8, filed Sep. 18, 1999.

BACKGROUND OF THE INVENTION

The invention relates to an intake device for an internal combustion engine comprising a mounting flange for mounting to a cylinder head of an internal combustion engine and a plurality of intake pipes or ducts which open into a common plenum or collecting chamber.

GB 2 295 215 discloses a hollow plastic structure comprising at least two plastic components into which a further plastic component is inserted. The two plastic components are bonded together by welding. The object of this patent application is to insert different insert pieces between the two plastic components. The predefined structure of the two plastic components, however, limits the variability of the insert pieces.

SUMMARY OF THE INVENTION

It is an object of the invention to provide an improved intake device for an internal combustion engine.

Another object of the invention is to provide an intake device for an internal combustion engine which can be varied over a broad range with respect to the length and cross section of the intake pipes.

A still further object of the invention is to provide a variable intake device for an internal combustion engine which can be produced at reasonable cost.

These and other objects are achieved in accordance with the present invention by providing an intake device for an internal combustion engine comprising a mounting flange for mounting to a cylinder head of an internal combustion engine and a plurality of intake pipes which open into a common plenum, wherein the mounting flange comprises part of a first component in which the intake pipes end; a second component is provided into which the intake pipes extend, and a third component is provided which terminates the second component and forms the shape of the intake pipes, and wherein the first, second and third components are interconnected such that the second component is fixed to the first component in a positive fit, and the third component is fixed to the second component in a positive fit.

A significant advantage of the invention is that the intake device comprises three components. The first and the third components are predefined in their structure and design, but the second, i.e., the center component, can be used to vary both the intake cross section and the intake pipe length by different embodiments, i.e., variations.

Since only the center component is designed differently, the injection molds for the first and the third components do not need to be adapted. As a result, a wide variety of intake devices of different intake pipe lengths and different intake pipe cross sections can be produced merely by varying the mold of the second component.

In accordance with one embodiment of the invention, the intake cross section of the first component is adapted or matched to the intake cross section of the second component. This can be accomplished by an interchangeable part in the injection mold of the first component. This interchangeable part permits different cross-section junctions.

The second component forms two segments of the intake pipe. By varying the height of the second part, these segments can be lengthened or shortened, so that a variable intake pipe length can be created with the second component.

In a further embodiment of the invention, in the second component encloses a hollow space, which can be used as a negative pressure accumulator or as a seat for mechanical or electrical components. This hollow space can be sealed in a pressure tight manner by suitable covers or closing elements.

In accordance with a further embodiment of the invention, a filter housing may be arranged on the first component. The first component then acts as a carrier and as a basic body or floor. This combination of filter and intake device creates a highly compact unit to supply an internal combustion engine with intake air.

The invention also relates to a method for producing an intake device from three synthetic resin housing parts. Each of these housing parts is provided with sealing surfaces. The sealing surfaces are successively brought into contact and are bonded or welded together by applying a bonding force. Production of such an intake device involves only two assembly steps to construct the complete unit from the three parts.

The invention permits many variations with respect to the use of different components. It is possible, for instance, to predefine the first component with respect to structure and design and to configure the center and third components differently, that is, to modify the intake cross section as well as the intake pipe length through variation. It is of course also possible to configure the first and the third component differently and to predefine the second component. The advantage of the invention is that it requires the fewest possible tools for production while offering the greatest possible variability.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail with reference to illustrative preferred embodiments shown in the accompanying drawings in which.

DETAILED DESCRIPTION OF PREFERRED EMBODIMENTS

Figure 1:
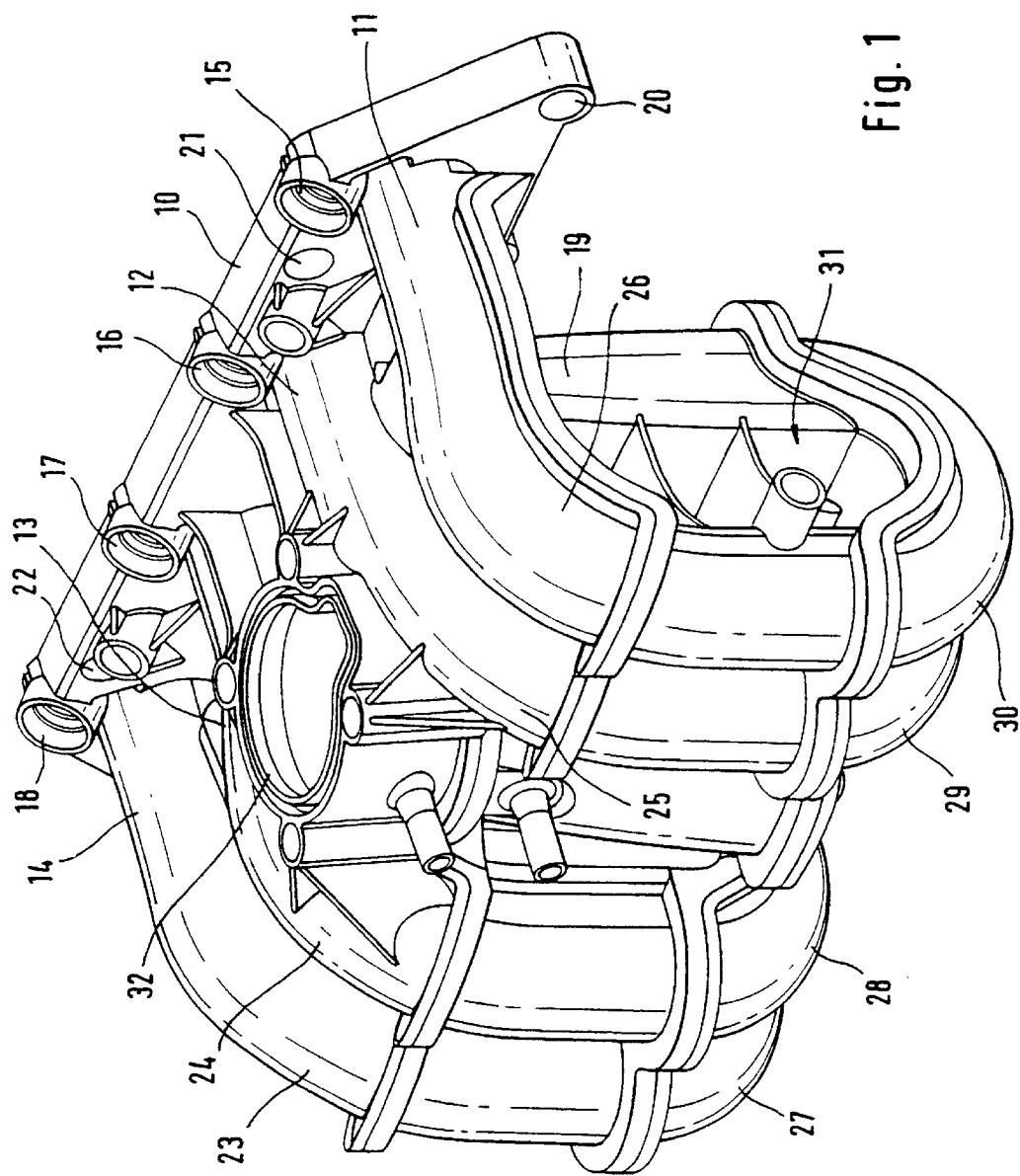
FIG. 1 is a perspective view of an intake device according to the invention.

The perspective view of the intake device shown in FIG. 1 has a mounting flange 10 in which intake pipes 11, 12, 13 and 14 end. Sockets 15, 16, 17 and 18 for fuel injection valves are provided above the intake pipes. A port 32 for the intake air supply is provided between the intake pipes 12 and 13. Through this port, the intake air reaches a common plenum 19, which is visible in the front part. The mounting flange 10 is equipped with mounting bolt bores 20, 21 and 22 as well as other bores, which are not visible here. The mounting flange is fastened to the cylinder head of an internal combustion engine by suitable threaded connecting elements. The mounting flange 10 and the upper shells 23, 24, 25, 26 form the first component of the intake device. Opposite thereto are the lower shells 27, 28, 29, 30 of the intake device, which form the third component. The center component 31 is located between the upper shells and the lower shells.

Figure 2:
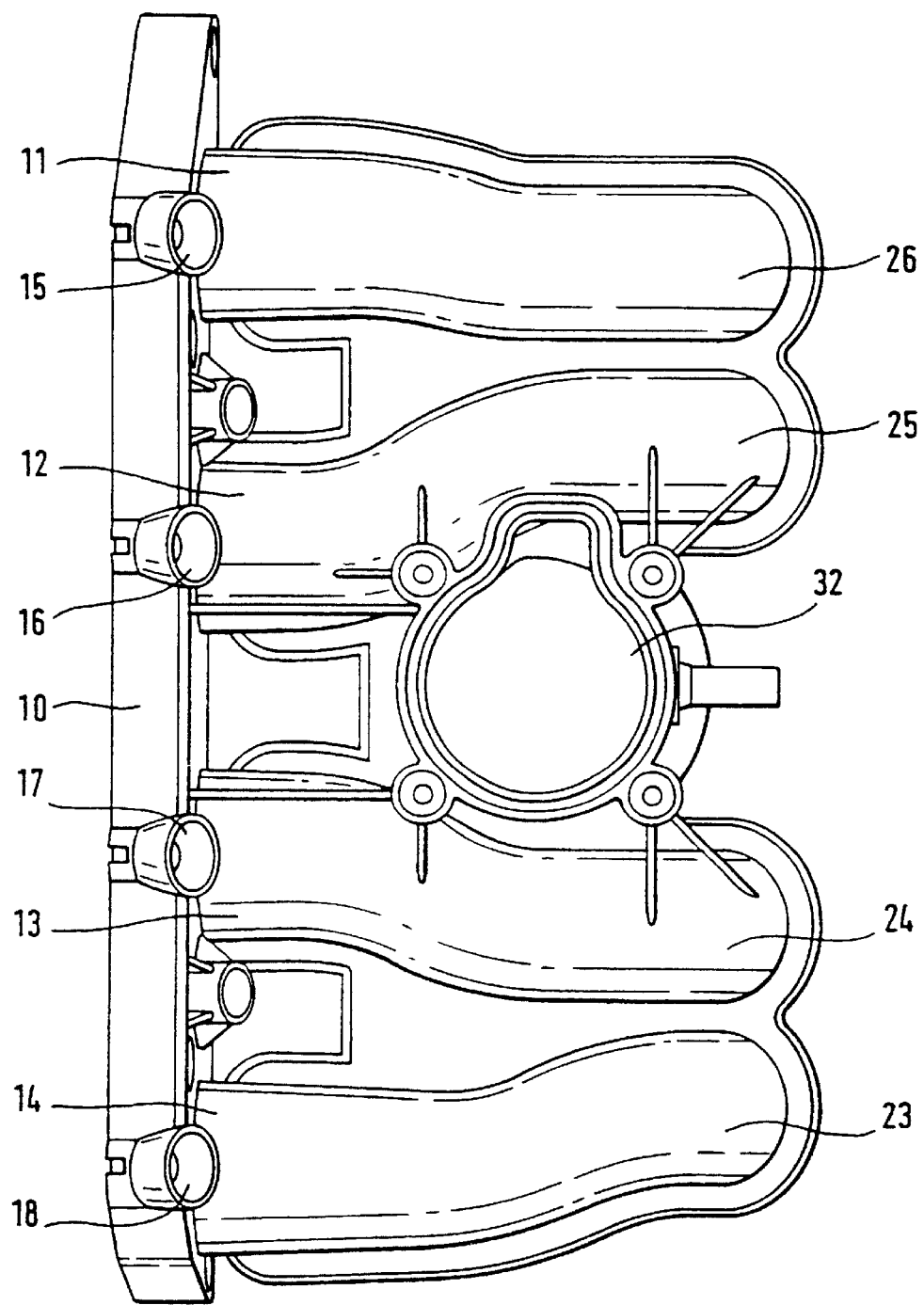
FIG. 2 is a top view of the intake device of FIG. 1.

The top view depicted in FIG. 2 shows the upper shells 23 through 26 and the mounting flange 10 as well as the sockets 15 through 18 for the fuel injector nozzles. An air filter housing is mounted to port 32. This air filter housing comprises an unfiltered air space and a filtered air space and a filter element arranged therebetween. The air filter housing can be adapted and fixed directly to the upper shells by any suitable fasteners.

Figure 3:
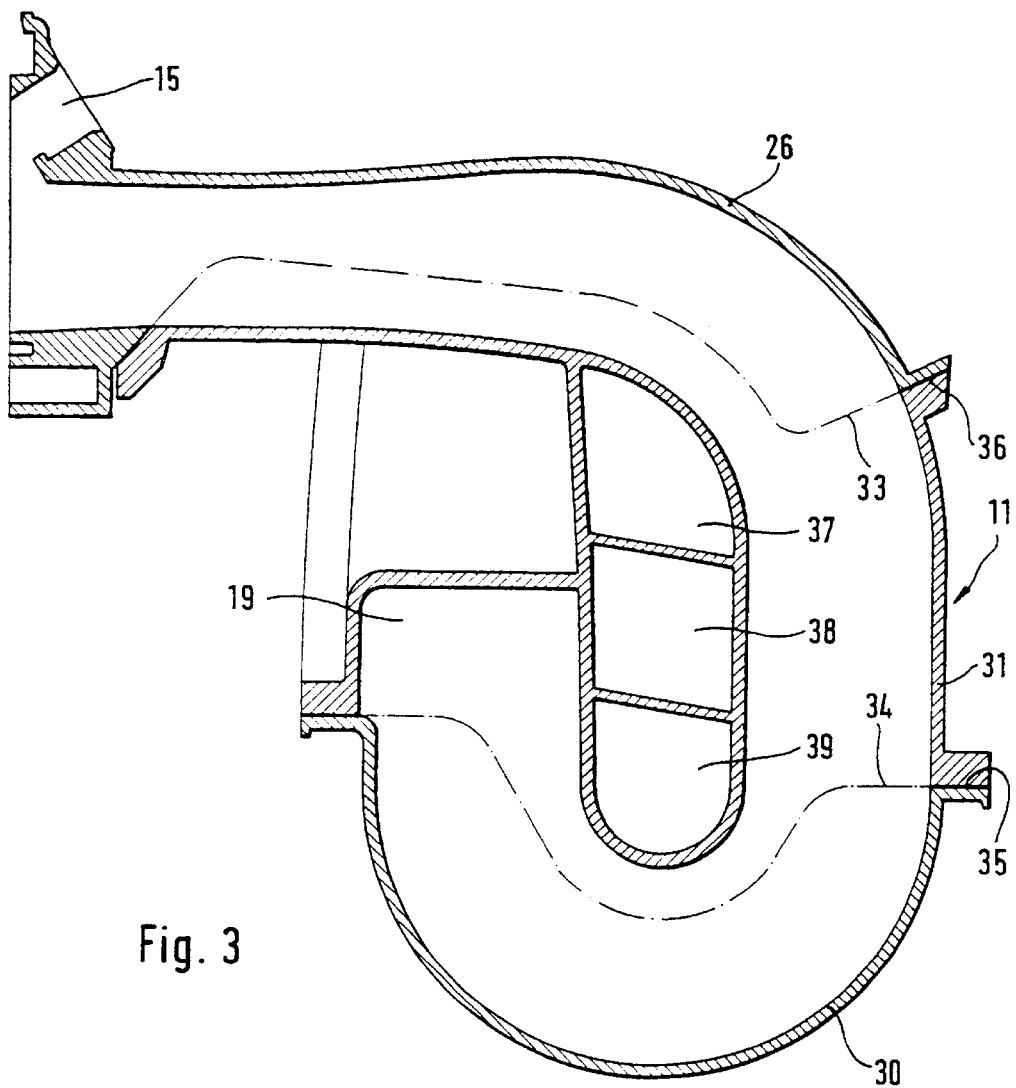
FIG. 3 is a cross sectional view through the intake device of FIG. 1.

FIG. 3 shows a cross section through intake pipe 11, which is shown in FIGS. 1 and 2. It comprises the upper shell 26, the lower shell 30 and the center component 31. Broken lines indicate the joints between the three components. A pressure-tight connection by friction welding is effected both along the upper joint line 33 and the lower joint line 34. To this end, the circumferential mating surfaces 35, 36 are designed accordingly. The center component 31 comprises 3 hollow spaces 37, 38, 39. These volumes are not required for the intake system and may serve to accommodate a pressure accumulator, for instance, or additional mechanical or electrical components.

The joint lines 33, 34 between the components are designed to be suitable for welding, i.e., starting from a welding plane, which extends perpendicularly to the pressure direction of a welding device, they have a maximum angular deviation of 45°. This ensures that a uniform joint is created along the mating surfaces 35, 36 when the parts are welded together.

Figure 4:
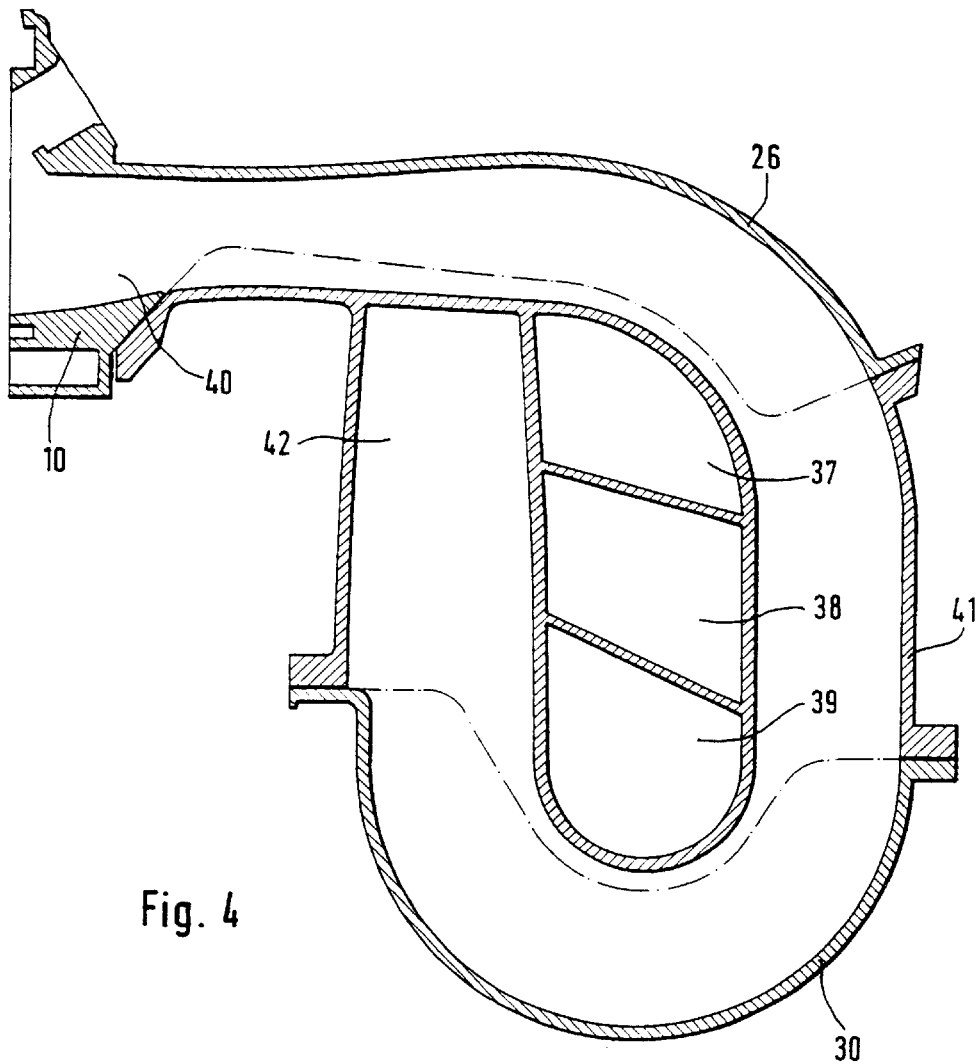
FIG. 4 is a cross section through a shortened intake device according to the invention.

FIG. 4 shows a variant of an intake device in which the lower shell is identical to the lower shell 30 of FIG. 3. The upper shell is also largely identical to the upper shell 26 of FIG. 3. The only difference is at the mounting flange 10, where a tapering of the intake cross section 40 may be observed. This tapering is used to adapt the upper shell to a modified center component. The center component has larger hollow interior spaces 37, 38 and 39 and thus forms a smaller intake cross section.

At the same time, the center component 41 is designed in such a way that the intake length is enlarged. Whereas in FIG. 3 the plenum 19 is arranged directly above the lower shell 30, plenum 42 of FIG. 4 is located below the upper shell 26, so that a greater intake length is produced. A comparison of the two FIGS. 3 and 4 clearly shows that varying the center component makes it possible to adapt the intake device to different internal combustion engines. This adaptation is variable with respect to both the intake cross-section and the intake length. It is of course also possible to realize other variants, e.g., an enlargement of the intake cross section and an enlargement of the intake length or a reduction in the intake cross section and a simultaneous reduction in the intake length, by correspondingly adapting the center component.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. An intake device for an internal combustion engine comprising a mounting flange for mounting to a cylinder head of an internal combustion engine and a plurality of intake pipes which open into a common plenum, wherein the mounting flange comprises part of a first component in which the intake pipes end; a second component is provided into which the intake pipes extend, and a third component is provided which terminates the second component and forms the shape of the intake pipes, and wherein the first, second and third components are interconnected such that the second component is fixed to the first component in a positive fit; the second component encloses a hollow space configured as a seat for a mechanical or electrical component, and the third component is fixed to the second component in a positive fit.

2. An intake device according to claim 1, wherein the second component has a variable cross section.

3. An intake device according to claim 1, wherein the intake cross section of the first component is adapted to the intake cross section of the second component.

4. An intake device according to claim 1, wherein the second component has a variable intake pipe length.

5. An intake device according to claim 1, wherein said hollow space is configured as a negative pressure accumulator.

6. An intake device according to claim 1, further comprising a filter housing arranged on said first component.

* * * * *